2,746,968

NOVEL DIACYLATED HYDRAZINES AND PROCESS FOR THE MANUFACTURE THEREOF

Balthasar Hegedüs, Basel, Switzerland, assignor to Hoffmann-La Roche Inc., Nutley, N. J., a corporation of New Jersey No Drawing. Application November 3, 1953, Serial No. 390,095

Claims priority, application Switzerland December 2, 1952

11 Claims. (Cl. 260—295)

The present invention concerns novel diacylated hydrazines of the general Formula (I)

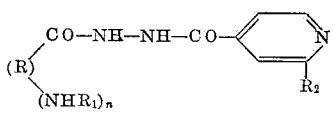

wherein (R) stands for the radical of an α-amino acid, preferably having not more than about 10 carbon atoms, from which the carboxylic and amino groups have been split off, $R_1$ represents an acyl radical or a hydrogen atom, $R_2$ a methyl group or a hydrogen atom and $n$ is one of the numbers 1 and 2.

Suitable amino acids are for example methionine, α-alanine and the phenyl substituted derivatives thereof, glycine, leucine, lysine, etc. The symbol $R_1$ may for example stand for the following acyl groups: acetyl, propionyl, butyryl, etc. or more particularly those acyl groups, which may easily be hydrogenolyzed off, such as: the carbobenzoxy, the carboallyloxy or the carbonaphthomethyloxy group.

The above compounds are crystallized substances, which are colorless or slightly yellow colored and which are easily to slightly soluble in water, the reaction of the aqueous solution being neutral, if $R_1$ is an acyl radical, or strongly alkaline, if $R_1$ is a hydrogen atom. The said compounds are chemotherapeutically active, more particularly against tuberculosis.

The invention further provides a process for the manufacture of the above novel compounds which process comprises reacting a compound of the general formula R'—NHNH$_2$ with the anhydride or the acyl halide of an acid of the general formula R"—OH, one of the two symbols R' and R" representing the pyridyl-4-carbonyl or the 2-methyl-pyridyl-4-carbonyl radical, whereas the other symbol represents the acyl radical

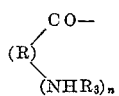

wherein (R) stands for the radical of an α-amino acid, as defined above, from which the carboxylic and amino groups have been split off, $R_3$ is an acyl radical and $n$ is one of the numbers 1 and 2, whereupon, if $R_3$ is a carbobenzoxy, carboallyloxy or carbonaphthomethyloxy radical, the latter group may be hydrogenolyzed off.

The invention also provides an alternative process for the manufacture of the same novel diacylated hydrazines of Formula I. This alternative process comprises reacting a mixed anhydride of the general formula

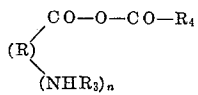

obtained according to methods known per se from a N-acylated α-amino acid, as defined above, and an acid halide of the general formula Hal—CO—R$_4$, with an acid hydrazide of the general formula

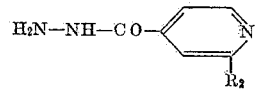

whereupon, if $R_3$ represents a carbobenzoxy, carboallyloxy or a carbonaphthomethyloxy radical, the said radical may be hydrogenolyzed off. In the above formulae (R) stands for the radical of an α-amino acid, as defined above, from which the carboxylic and amino groups have been split off, $R_3$ stands for an acyl group, $R_2$ for hydrogen or a methyl group, $R_4$ for an alkoxy, aryl or alkyl group and $n$ for the number 1 or 2.

The acylated amino acid hydrazides used as starting material may be obtained according to methods known per se by treating the corresponding acylated amino acid esters (Helvetica Chimica Acta, volume 12 [1929], page 317) with hydrazine. The 2-methyl-pyridine-4-carboxylic acid hydrazide, used as starting material, may be obtained by esterifying 2-methyl-pyridine-4-carboxylic acid and reacting the ester formed with hydrazine.

It will be understood that the present invention comprises the process described as applied to all stereoisomeric forms of the amino acids concerned.

Example 1

61.5 parts by weight of N-acetyl-methionine-hydrazide of melting point 100–102° C. [prepared from N-acetyl-methionine-ethyl-ester (Helvetica Chimica Acta, volume 12 (1929), page 317) and hydrazine hydrate] are suspended in 360 parts by volume of anhydrous pyridine and, with temporary cooling, 53.4 parts by weight of isonicotinic acid chloride hydrochloride are added portionwise. A clear, dark red-brown solution is obtained. After allowing the same to stand overnight at room temperature, it is diluted with approx. 500 parts of water, and 50 parts by weight of potassium carbonate are slowly added. The mixture is distilled in vacuo until the odor of pyridine has disappeared, water being repeatedly added, if need be. It is then diluted to 500–600 parts by volume, filtered through charcoal and the pH is adjusted to 4.5–5 by means of hydrochloric acid. After having been maintained for prolonged time in an ice box, the $N^1$-isonicotinyl-$N^2$-(N-acetyl-methionyl)-hydrazine slowly begins to crystallize. After 2–3 days it is sucked off and recrystallized from little water. Melting point 203–204° C.

Example 2

70 parts by weight of N-acetyl-leucine-hydrazide of melting point 95–100° C. [prepared from N-acetyl-leucine-ethylester (Helvetica Chimica Acta, volume 12 [1929] page 317) and hydrazine hydrate] are suspended in 300 parts by volume of anhydrous pyridine and, with temporary cooling, 67 parts by weight of isonicotinic acid chloride hydrochloride are added. The red-brown solution is allowed to stand at room temperature for 3 days and the reaction product is isolated according to Example 1. The $N^1$-isonicotinyl-$N^2$-(N-acetyl-leucyl)-hydrazine obtained is recrystallized from little water and melts at 208–210° C.

Example 3

18 parts by weight of N-acetyl-phenyl-alanine-hydrazide (J. Am. Chem. Soc., volume 72 [1950], page 5317) in 120 parts by volume of pyridine are reacted with 14.5 parts by weight of isonicotinic acid chloride hydrochloride as described in Examples 1 and 2. The reaction mixture is worked up as in Example 1. The $N^1$-isonicotinyl-$N^2$-(N-acetyl-phenyl-alanyl)-hydrazine formed is recrystallized in a large amount of water and melts then at 210–213° C.

Example 4

29 parts by weight of N-acetyl-glycine-hydrazide of melting point 95–97° C. [prepared from N-acetyl-glycine-ethylester (Helvetica Chimica Acta, volume 12 [1929], page 317) and hydrazine hydrate] are suspended in 300 parts by volume of anhydrous pyridine and, while cooling, 54 parts by weight of isonicotinic acid chloride hydrochloride are added. The clear, brown-red solution is allowed to stand overnight at room temperature, then it is diluted with 1000 parts of water and 75 parts by weight of potassium carbonate are slowly added. The pyridine is removed by distillation in vacuo (smell control!) and the solution is adjusted to pH 4.5–5 by means of hydrochloric acid. After one hour's cooling with ice water, a small amount of precipitated isonicotinic acid is removed by filtration, the filtrate is treated with charcoal and filtered. The filtrate is evaporated in vacuo to a mash and 1000 parts by volume of alcohol are added. The precipitated potassium chloride is removed by sucking off, the filtrate is evaporated in vacuo to dryness and the residue is completely dried by distilling twice in vacuo with 400 parts by volume of benzene each. The residue is boiled with 800 parts by volume of absolute alcohol, it is filtered from small amounts of potassium chloride and allowed to crystallize overnight in the ice box. After repeated recrystallization from 800 parts by volume of absolute alcohol, pure $N^1$-isonicotinyl-$N^2$-(N-acetyl-glycyl)-hydrazine is obtained. Melting point 226–227° C.

Example 5

30 parts by weight of N-acetyl methionine-hydrazide (see Example 1) are suspended in 180 parts by volume of anhydrous pyridine and, while cooling temporarily, 30 parts by weight of 2-methyl-isonicotinic acid chloride hydrochloride are added portionwise. The mixture is allowed to stand overnight and processed further as described in Example 1. The $N^1$-(2-methyl-isonicotinyl)-$N^2$-(N-acetyl-methionyl)-hydrazine obtained melts at 156–158° C.

Example 6

31.3 parts by weight of N-carbobenzoxy-phenyl-alanine-hydrazide (Biochem. Journal, volume 46 [1950], page 196) are suspended in 300 parts by volume of anhydrous pyridine and, while cooling temporarily, 17.8 parts by weight of isonicotinic acid chloride hydrochloride are added. The mixture is worked up as described in Example 1. The $N^1$-isonicotinyl-$N^2$-(N-carbobenzoxy-phenyl-alanyl)-hydrazine formed is recrystallized from 500–600 parts by volume of acetone. Melting point 183–185° C.

A solution of 30 parts by weight of $N^1$-isonicotinyl-$N^2$-(N-carbobenzoxy-phenyl-alanyl)-hydrazine in 300 parts by volume of dioxane, 150 parts by weight of alcohol and 150 parts of water is energetically stirred in the presence of palladium black, while introducing hydrogen. The hydrogenolysis is completed within 20–24 hours. The catalyst is filtered off, the solution is evaporated in vacuo and the oily base is dissolved in little absolute alcohol. By the addition of alcoholic hydrochloric acid, the dihydrochloride of the $N^1$-isonicotinyl-$N^2$-phenyl-alanyl-hydrazine is precipitated in the form of well-structured crystals. Melting point 235–237° C.

Example 7

10.3 parts by weight of acetyl-glycine-hydrazide are suspended in 200 parts by volume of anhydrous pyridine and, while cooling, 19 parts by weight of 2-methyl-isonicotinic acid chloride hydrochloride are added. The mixture is worked up as described in Example 4. The $N^1$-(2-methyl-isonicotinyl)-$N^2$-acetyl-glycyl-hydrazine obtained melts at 193–194° C.

Example 8

19 parts by weight of hippuric acid hydrazide are suspended in 200 parts by volume of anhydrous pyridine and, while cooling, 17.6 parts by weight of isonicotinic acid chloride hydrochloride are added portionwise. The mixture is allowed to stand overnight at room temperature, sucked off from small amounts of insoluble material and worked up as described in Example 1. The $N^1$-isonicotinyl-$N^2$-hippuryl-hydrazine melts at 240–242° C.

Example 9

As described in Example 8, 19 parts by weight of hippuric acid hydrazide are reacted with 19 parts by weight of 2-methyl-isonicotinic acid chloride hydrochloride. When working up in accordance with Example 8, $N^1$-(2-methyl-isonicotinyl)-$N^2$-hippuryl-hydrazine of melting point 224–226° C. is obtained.

Example 10

14.5 parts by weight of DL-α-acetyl-alanine-hydrazide of melting point 135–136° C. (prepared from DL-α-acetyl-alanine-ethylester and hydrazine hydrate) are suspended in 150 parts by volume of anhydrous pyridine and, as described in the preceding examples, reacted with 17.8 parts by weight of isonicotinic acid chloride hydrochloride. When working up in accordance with Example 1, the $N^1$-isonicotinyl-$N^2$-(DL-α-acetyl-alanyl)-hydrazine obtained melts at 191–193° C.

Example 11

14.5 parts by weight of L(+)-α-acetyl-alanine-hydrazide (melting point 137–139° C.; $[\alpha]_D = -61°$ ($c=1$ in water), prepared from L(+)-α-acetyl-alanine-ethylester and hydrazine hydrate) are reacted, as described in Example 10, with 17.8 parts by weight of isonicotinic acid chloride hydrochloride. The $N^1$-isonicotinyl-$N^2$-(L(+)-α-acetyl-alanyl)-hydrazine obtained melts at 205–208° C.; $[\alpha]_D = -82.9°$ ($c=1$ in water).

Example 12

47 parts by weight of L(−)-acetyl-methionine-hydrazide (melting point 123–126° C.; $[\alpha]_D = -19.1°$ ($c=1$ in water), prepared from L(−)-acetyl-methionine-ethylester and hydrazine hydrate) are reacted in 250 parts by volume of anhydrous pyridine with 42 parts by weight of isonicotinic acid chloride hydrochloride. When working up in accordance with Example 1, the $N^1$-isonicotinyl-$N^2$-(L(−)-acetyl-methionyl)-hydrazine obtained melts at 184–186° C.; $[\alpha]_D = -33°$ ($c=1$ in N-hydrochloric acid).

Example 13

14.5 parts by weight of D(−)-α-acetyl-alanine-hydrazide (melting point 143–145° C.; $[\alpha]_D = +63.2°$ ($c=1$ in water), prepared from D(−)-α-acetyl-alanine-ethylester and hydrazine hydrate) are reacted, as described in Example 10, with 17.8 parts by weight of isonicotinic acid chloride hydrochloride. The $N^1$-isonicotinyl-$N^2$-(D(−)-α-acetyl-alanyl)-hydrazine obtained melts at 204–205° C.; $[\alpha]_D = +83.8°$ ($c=1$ in water).

Example 14

42 parts by weight of D(+)-acetyl-methionine-hydrazide (melting point 113–116° C.; $[\alpha]_D = +22.7°$ ($c=1$ in water), prepared from D(+)-acetyl-methionine-ethylester and hydrazine hydrate) are reacted in 200 parts by volume of anhydrous pyridine with 36.5 parts by weight of isonicotinic acid chloride hydrochloride. The $N^1$-isonicotinyl-$N^2$-(D(+)-acetylmethionyl)-hydrazine is isolated in accordance with Example 1 and melts at 186–189° C.; $[\alpha]_D = +39°$ ($c=1$ in N-hydrochloric acid).

Example 15

40 parts by weight of L(−)-acetyl-leucine-hydrazide (melting point 135–137° C.; $[\alpha]_D = -37.5°$ ($c=1$ in water), prepared from L(−)-acetyl-leucine-ethylester and hydrazine hydrate) are reacted in 150 parts by volume of anhydrous pyridine with 39 parts by weight of isonicotinic acid chloride hydrochloride. When working up as described in Example 2, the $N^1$-isonicotinyl-$N^2$-(L(−)- acetyl-leucyl)-hydrazine melts at 222–225° C.; $[\alpha]_D = -58.6°$ ($c=1$ in N-hydrochloric acid).

*Example 16*

In a manner analogous to that of Example 15, 50 parts by weight of D(+)-acetyl-leucine-hydrazide (melting point 138–140° C.; $[\alpha]_D = +35.7°$ ($c=1$ in water) are reacted with 49 parts by weight of isonicotinic acid chloride hydrochloride in 150 parts by volume of anhydrous pyridine. The $N^1$-isonicotinyl-$N^2$-(D(+)-acetyl-leucyl)-hydrazine obtained melts at 222–227° C.; $[\alpha]_D = +60.8°$ ($c=1$ in N-hydrochloric acid).

*Example 17*

29 parts by weight of DL-acetyl-methionine are suspended in 250 parts by volume of acetyl chloride. 32 parts by weight of phosphorous pentachloride are added in 4–5 portions, while cooling with ice and stirring. After two hours' stirring, a clear solution is obtained, which for purposes of crystallization, is kept in an ice box in the absence of humidity. The crystallized DL-acetyl-methionyl-chloride is sucked off after 18–20 hours and washed with petroleum ether. Melting point 91–94° C.

To a suspension of 2.7 parts by weight of isonicotinic acid hydrazide in 60 parts by volume of absolute pyridine are added, while cooling, 4.2 parts by weight of DL-acetyl-methionyl-chloride. The mixture is worked up as in Example 1. The $N^1$-isonicotinyl-$N^2$-(DL-acetyl-methionyl)-hydrazine obtained melts at 203–204° C. and, when mixed with the compound prepared in accordance with Example 1, no melting point depression is observed.

*Example 18*

19 parts by weight of N-acetyl-methionine are suspended in 200 parts by volume of chloroform, and 11.2 parts by volume of triethylamine are added thereto. The clear solution obtained is getting warm. It is cooled in ice water and, while stirring, 9.6 parts by volume of ethyl chloro-formate diluted with little chloroform are added in the course of 10–15 minutes. During this operation, atmospheric moisture must carefully be excluded. A mixed anhydride of N-acetylmethionine and monoethyl carbonate is formed. After further 10 minutes, 13.6 parts by weight of isonicotinic acid hydrazide are added and the mixture is stirred without cooling for 2 hours. It is then shaken with 400 parts by volume of 1.5 N hydrochloric acid, the aqueous layer is washed once with ether, the ether is removed in vacuo and the reaction of the solution is adjusted to pH 5 by means of sodium hydroxide solution. The $N^1$-isonicotinyl-$N^2$-(N-acetyl-methionyl)-hydrazine crystallizes overnight in the ice box. After recrystallization from water it melts at 203–204° C.

*Example 19*

When working according to Example 18, except that 15 parts by weight of 2-methyl-pyridine-4-carboxylic acid hydrazide are used instead of isonicotinic acid hydrazide, the product obtained is $N^1$-(2-methyl-pyridyl-4-carbonyl)-$N^2$-(N-acetyl-methionyl)-hydrazine, which after recrystallization from water melts at 156–158° C.

*Example 20*

32 parts by weight of N-carbobenzoxy-glycine are dissolved together with 16.8 parts by volume of triethylamine in 300 parts by volume of chloroform and, as described in Example 18, reacted with 14.4 parts by volume of ethyl chloro-formate. The mixed anhydride of N-carbobenzoxy-glycine and monoethyl carbonate is formed. After 10 minutes, 20.4 parts by weight of isonicotinic acid hydrazide are added and the mixture is worked up as described in Example 18. After recrystallization from much water, the $N^1$-isonicotinyl-$N^2$-(N-carbobenzoxy-glycyl)-hydrazine obtained melts at 159–160° C.

30 parts by weight of the above compound are dissolved in a mixture of 600 parts by volume of water and 15 parts by volume of concentrated hydrochloric acid. After addition of 0.1–0.2 part by weight of palladium black, hydrogen is introduced with energetic stirring during 20–24 hours. The solution is filtered off from the catalyst and concentrated in vacuo. It is then adjusted to pH 7.8–8 by means of aqueous sodium hydroxide, whereupon the $N^1$-isonicotinyl-$N^2$-glycyl-hydrazine soon begins to precipitate. After recrystallization from water, it melts at 212–214° C.

*Example 21*

When working according to Example 20, except that 33.4 parts by weight of N-carbobenzoxy-α-alanine are used instead of N-carbobenzoxy-glycine, the product obtained is $N^1$-isonicotinyl-$N^2$-(N-carbobenzoxy-α-alanyl)-hydrazine, which after recrystallization from much water melts at 192–194° C. Upon hydrogenolysis in accordance with the procedure of Example 20, the above product is converted into $N^1$-isonicotinyl-$N^2$-(α-alanyl)-hydrazine, which after recrystallization in little water melts at 199–200° C.

*Example 22*

When proceeding according to Example 20, except that 26 parts by weight of L(+)-N-carbobenzoxy-α-alanine are used instead of N-carbobenzoxy-glycine, and, once the hydrogenolysis is completed, concentrating in vacuo and precipitating with alcohol, the product obtained is (+) - $N^1$-isonicotinyl-$N^2$-(L-α-alanyl)-hydrazine-dihydrochloride, which melts at 230–234° C.; $[\alpha]_D = 24.8°$ ($c=1$ in water).

*Example 23*

When proceeding according to Example 20, except that 60 parts by weight of DL-N-carbobenzoxy-leucine are used instead of N-carbobenzoxy-glycine and, once the hydrogenolysis is completed, concentrating in vacuo, dissolving the residue in alcohol and precipitating with ethyl acetate, the product obtained is $N^1$-isonicotinyl-$N^2$-(DL-leucyl)-hydrazine-dihydrochloride, which melts at 220–224° C.

*Example 24*

When proceeding according to Example 20, except that 45 parts by weight of L(−)-α,ε-dicarbobenzoxy-lysine are used instead of N-carbobenzoxy-glycine and, once the hydrogenolysis is completed, concentrating in vacuo and digesting the syrup obtained with alcohol, whereupon it decomposes to a crystal powder, the latter is (+)$N^1$-1-isonicotinyl - $N^2$ - (L - lysyl) - hydrazine-trihydrochloride, which melts at 260–265° C.; $[\alpha]_D = +37.4°$ ($c=1$ in water).

I claim:

1. A process for the production of compounds represented by the formula

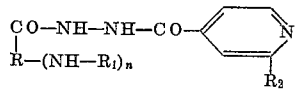

wherein R represents the radical of a naturally occurring α-amino acid, having less than 11 carbon atoms, from which the carboxy group and the amino group have been split off, $R_1$ represents a member of the group consisting of hydrogen, acyl, carbalkoxy and carbaralkoxy, $R_2$ represents a member of the group consisting of hydrogen and methyl, and $n$ represents an integer from 1 to 2, which comprises reacting a member of the group consisting of isonicotinic acid hydrazide and 2-methyl isonicotinic acid hydrazide with a member of the group consisting of the anhydride and acyl halide of an acid having the formula R″—OH wherein R″ represents the acyl radical

R, $R_1$ and $n$ having the same significance as above.

2. A process for the production of diacylated hydrazines which comprises reacting a mixed anhydride represented by the formula

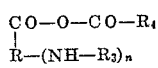

wherein R represents the radical of a naturally occurring α-amino acid, having less than 11 carbon atoms, from which the carboxy and amino groups have been split off, $R_3$ represents a member of the group consisting of acyl, carbalkoxy and carbaralkoxy, $R_4$ is a member of the group consisting of alkoxy, aryl and alkyl, and $n$ represents an integer from 1 to 2, with an acid hydrazide represented by the formula

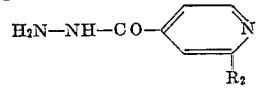

wherein $R_2$ represents a member of the group consisting of hydrogen and methyl.

3. Process in accordance with claim 2, which comprises reacting isonicotinic acid hydrazide with the mixed anhydride obtained from N-acetyl-methionine and ethyl chloro-formate.

4. Process in accordance with claim 2, which comprises reacting 2-methyl-pyridine-4-carboxylic acid hydrazide with the mixed anhydride obtained from N-acetyl-methionine and ethyl chloroformate.

5. A diacylated hydrazine represented by the formula

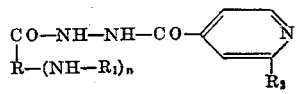

wherein R represents the radical of a naturally occurring α-amino acid, having less than 11 carbon atoms, from which the carboxy group and the amino group have been split off, $R_1$ presents a member of the group consisting of hydrogen, acyl, carbalkoxy and carbaralkoxy, $R_2$ represents a member of the group consisting of hydrogen and methyl, and $n$ represents an integer from 1 to 2.

6. $N^1$ - isonicotinyl-$N^2$-(N-acetyl-methionyl)-hydrazine.

7. A $N^1$ - isonicotinyl - $N^2$ - (α-amino-acyl)-hydrazine, wherein the amino-acyl radical is a radical of a naturally occurring α-amino acid having less than 11 carbon atoms.

8. A $N^1$-isonicotinyl-$N^2$-(α-acylamino-acyl)-hydrazine wherein the amino-acyl radical is a radical of a naturally occurring α-amino acid having less than 11 carbon atoms.

9. A $N^1$ - (2 - methyl-isonicotinyl)-$N^2$-(α-amino-acyl)-hydrazine, wherein the amino-acyl radical is a radical of a naturally occurring α-amino acid having less than 11 carbon atoms.

10. A $N^1$ - (2 - methyl - isonicotinyl)-$N^2$-(α-acylamino-acyl)-hydrazine, wherein the amino-acyl radical is a radical of a naturally occurring α-amino acid having less than 11 carbon atoms.

11. $N^1$ - (2 - methyl-isonicotinyl)-$N^2$-(N-acetyl-methionyl)-hydrazine.

References Cited in the file of this patent

Conant et al.: The Chem. or Oreg. Compounds, 3rd ed., 1947.